UNITED STATES PATENT OFFICE.

ISABELLA S. GRAVES, OF FISHKILL-ON-THE-HUDSON, NEW YORK.

INSECTICIDE.

SPECIFICATION forming part of Letters Patent No. 293,320, dated February 12, 1884.

Application filed October 10, 1883. (No specimens.)

*To all whom it may concern:*

Be it known that I, ISABELLA S. GRAVES, of Fishkill-on-the-Hudson, in the county of Dutchess and State of New York, have invented an improved compound for protecting plants and seeds from insects and other vermin, of which the following is a specification.

The object of my invention is to provide a liquid compound or wash which, when sprinkled over or otherwise applied to the ground surrounding vines, trees, shrubs, and other plants, and to the leaves, stalks, and bark of the plants, will be very effective in protecting them from the attack of insects and destroying the insects that prey upon them, and which will also fertilize the plants and prevent mold. The same compound may be used to sprinkle the ground where seeds are sown, and will preserve the seeds from the attack of birds and vermin.

To these ends the invention consists in a liquid compound or wash composed of oleate of potash, nitrate of potash, alum, and water. The oleate of potash which I use may be made by mixing together about three pounds of oleine, in the form of any suitable oil, one pound of potash, and three pounds of water.

In preparing my compound I take of the several ingredients about the following proportions: oleate of potash, about four ounces; nitrate of potash, about one-half ounce; alum, about one-half ounce; water, about three gallons. The nitrate of potash and alum may be pulverized, and they, with the oleate of potash, may be kept until required for use, and then mixed with the required quantity of water.

The proportions of the several ingredients above stated I have found to answer the desired purpose; but for different uses it may be found advantageous to depart from these proportions more or less.

The compound or wash may be sprinkled on the plants and over the ground around the plants; or it may be applied to the stalks and other parts of the plants in any other suitable way.

It may be found advantageous in some cases to sprinkle or dust fine coal-ashes or other pulverulent substance over the plants after applying the wash, so as to prevent it from so quickly drying off.

This compound or wash applied to plants or the ground surrounding them will destroy the articulates and other insects which prey upon them, and thus preserve and protect the plants, and it will also fertilize the plants and prevent mold, thus having a doubly beneficial effect. When applied to the ground, the compound will destroy or prevent the germination of the eggs of insects.

The compound may be advantageously used to protect vineyards against the attack of the phyloxera, and for this purpose it may be both sprinkled on the ground and applied to the stalks and leaves of the vines.

When the compound is sprinkled or applied to the ground where seeds are sown, it will protect the seeds from the attack of crows and other birds or vermin.

What I claim as my invention, and desire to secure by Letters Patent, is—

The compound herein described for protecting plants and seeds from insects and other vermin, consisting of oleate of potash, nitrate of potash, and alum, with water in proportions substantially as herein set forth.

ISABELLA S. GRAVES.

Witnesses:
   M. H. GRAVES,
   E. BAUDOUIN.